Feb. 4, 1936.    W. K. SIMPSON    2,029,950
THERMOSTATIC RELIEF VALVE
Filed Feb. 3, 1933
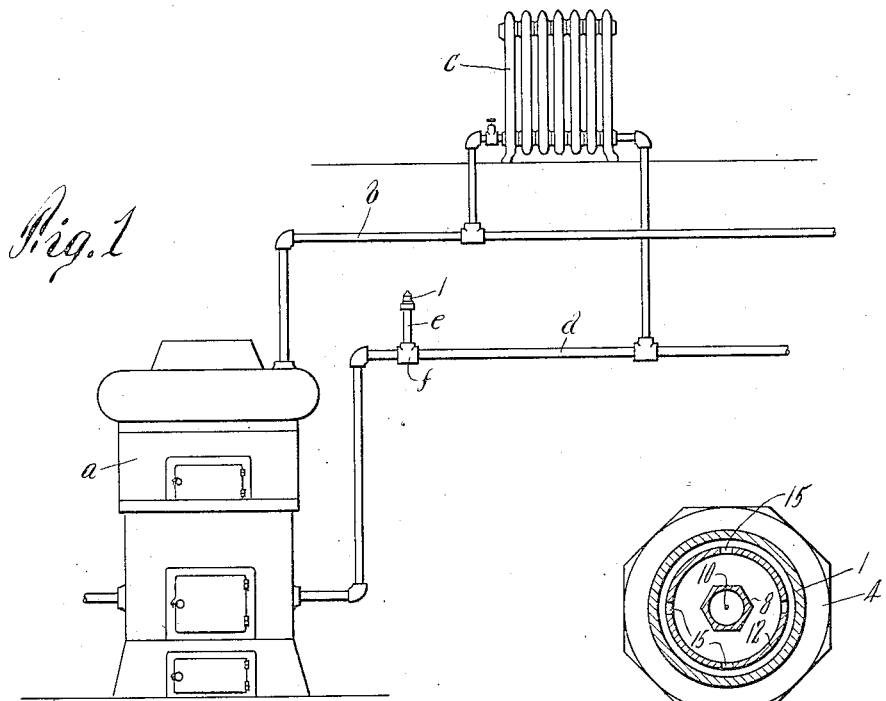
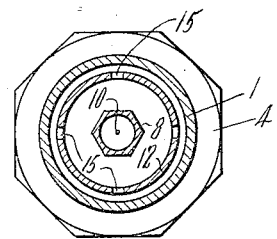
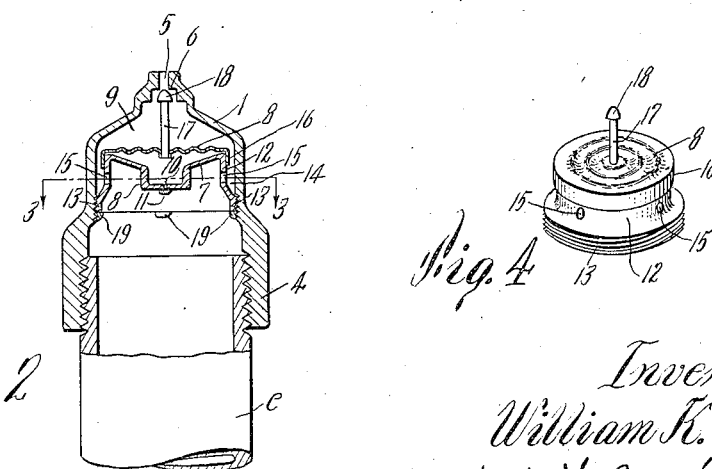
Inventor
William K. Simpson Patented Feb. 4, 1936

2,029,950

UNITED STATES PATENT OFFICE 2,029,950

THERMOSTATIC RELIEF VALVE

William K. Simpson, Waterbury, Conn., assignor to Hoffman Specialty Company, Waterbury, Conn., a corporation of Illinois Application February 3, 1933, Serial No. 655,076

5 Claims. (Cl. 236—64)

The present invention relates to thermostatic valves adapted to release low temperature fluid from a pipe or container and to prevent escape of high temperature fluid; or vice versa. More particularly the herein illustrated embodiment of the invention has been designed for use with steam heating systems for venting the ends of steam mains and risers, and the return line thereof, and in other situations where air is to be vented, without steam loss, particularly those where water is not present in quantities sufficient to escape from the open vent. The object is to provide a valve of simple construction having a small number of parts, which can be manufactured at low cost and supplied to users at a low price, in designs adapted to serve the specific uses above mentioned, and other analogous uses. The invention consists in the principles embodied in the form of valve here illustrated, in the specific details of such valve, and in equivalent modifications and reversals thereof embodying the same principles.

In the drawing filed herewith,—

Fig. 1 is a diagrammatic illustration of a steam heating system with the valve of this invention applied to the dry return line of the system;

Fig. 2 is a vertical central section of the valve;

Fig. 3 is a cross section taken on line 3—3 of Fig. 2;

Fig. 4 is a perspective view of the thermostat and valve assemblage.

Referring first to the diagram, $a$ represents a boiler, $b$ the steam main, $c$ one of the heating radiators, and $d$ the return line of any steam heating system. I represents the vent valve of the present invention applied to a pipe nipple $e$ which rises from a fitting $f$ in the return line; it being understood that the valve may be applied to the steam main, or to any of the risers of the system, or in any other location where venting of air without steam loss is desirable.

The valve in the present illustration is made as a shell to which the numeral I is applied in Fig. 2, made with an open internally threaded end portion 4 large enough to embrace and be screwed upon the threaded end of the pipe nipple $e$ or the like; or it may be externally threaded to screw into a pipe end or pipe fitting. Its opposite end is closed except for a central port 5, and is made with sufficient thickness to provide a valve seat 6 in, or at the inner end of, the port or vent passage.

A thermostat is mounted in the shell and is constructed of a dished base 7 and a flexible diaphragm 8 secured to the rim of the base. The central part 7a of the base is offset away from the diaphragm to make a recess enlarging the volume of the thermostatic chamber 9, and contains a small port 10 for admitting volatile fluid to the chamber and exhausting air. Such port, after the chamber has been thus charged, is sealed by any suitable means, such as a drop of solder 11.

A skirt 12 depends from the rim of the base and is expanded at its ends, the expanded zone 13 being externally threaded to engage internal threads in the shell. By reason of this construction an annular space 14 is provided between the skirt and the encircling part of the outer shell above the threaded zone 13. Ports 15 in the skirt provide open passageways to the annular space 14 from the lower part of the valve casing.

The diaphragm may be of any character which combines sufficient strength and flexibility. Preferably it is a corrugated disk of sheet metal, of well known character, having an encircling downturned flange 16 at the rim which fits closely about the rim and adjacent skirt portion of the base, and is soldered or otherwise hermetically sealed thereto. A valve stem 17 is secured to the central part of the diaphragm and projects toward the port 5, carrying on its end a valve element 18 adapted to close against the seat 6 and withdraw therefrom with movements of the diaphragm caused by expansion and contraction of the fluid in the thermostat chamber.

In assembling the parts of the valve, the thermostat and valve elements are put together, the thermostat chamber is exhausted of air and charged with suitable fluid, and the charging point 10 is sealed. This unit assemblage is then screwed into the main casing until the valve element seats on the valve seat 6, after which the assemblage is backed off enough to open the valve. From the conditions of the design it is known exactly how much the diaphragm will be distended by temperature rise from the temperature of the work room to that of live steam, and as the pitch of the threads is known, it is a simple matter to determine the angle through which the thermostatic unit need be turned in backing off to set the valve element where it will open the vent port when air is present, but will close when steam reaches the port. When thus adjusted, the thermostatic unit is secured immovably by any of a variety of possible means suitable for the purpose, such as by solder 19, by staking, or otherwise.

To facilitate the above described mode of setting and adjusting the thermostatic unit, the offset part 8 of the base thereof may be made hexagonal or of other non-circular form complemental to a socket wrench; or other types of tool may be engaged with the ports 15 or other equivalent slots or interior projections in the skirt 12.

It will be apparent that as long as the temperature of the valve is lower than that of live steam, air reaching the valve will pass freely through the ports 15, the annular space 14, and the vent port 5, but that the temperature of steam will expand the thermostat and close the valve so that no steam loss can occur. The same essential principles can evidently be applied in other designs where the temperature of opening and closing is other than that of live steam at atmospheric pressure, and/or where the valve is arranged to be opened by high temperature and closed by low temperature, or for the control of other fluids than air and steam.

A fundamental feature of the invention is its simplicity consisting in the illustrated design of only four parts, and these being in themselves simple and easily constructed. The main casing or body may be made of drawn brass or as a forging, or turned from a solid rod. The diaphragm base may be shaped from sheet metal by drawing or stamping operations or as a forging or casting, or cut from a solid block; and the diaphragm is made of sheet metal. If desired, the part of the main casing which contains the vent port may be made in a separate plug screwed into the body of the casing; while the base and its skirt portion may be made of originally separated pieces permanently secured together. Any metals may be used, but in practice ferrous metals or alloys are avoided, and metals or alloys chosen which are least susceptible to corrosion.

What I claim is:

1. A thermostatic valve comprising a casing having a relatively large open end and a wall extending across the opposite end containing a vent port, the intermediate sides of the casing having a threaded zone of smaller diameter than the open end, a thermostatic unit comprising a dished base and a flexible diaphragm hermetically sealed at its rim to the base across the concave side of the latter, the base having a skirt complementally threaded to engage the threaded zone of the casing, and being separated from the encircling walls of the casing, which skirt has one or more ports for making communication between the interior spaces of the shell at opposite sides of the thermostat, a valve element carried by said diaphragm in position to open and close said port with movements of the diaphragm effected by expansion and contraction of fluid in the thermostat chamber, and fastening means holding the threaded skirt immovably at a given point of engagement with the threaded zone.

2. A thermostatic valve unit comprising a concavo convex base having a skirt portion extending from its rim at the convex side, a flexible diaphragm crossing the concave side of the base and sealed hermetically at its rim thereto, and a valve unit carried by the central part of the diaphragm, said skirt portion having a threaded zone at one end, and one or more ports between said zone and the rim of the base.

3. A thermostatic valve unit comprising a concavo convex base having a skirt portion extending from its rim at the convex side, a flexible diaphragm crossing the concave side of the base and sealed hermetically at its rim thereto, and a valve unit carried by the central part of the diaphragm, said skirt portion having a threaded zone at one end and one or more ports between said zone and the rim of the base, and the base having an offset at its convex side of non-circular outline whereby it may be engaged by a wrench for torque application.

4. A thermostatic unit comprising a dished base having an offset from its central part providing a recess in the concave side of the base, and a protuberance at the convex side, a diaphragm crossing the concave side of the base and hermetically sealed at its rim to the rim of the base, and a skirt projecting from the base rim in the same direction as the convex side thereof, having an enlarged end zone and one or more ports between said zone and said rim.

5. A thermostatic valve comprising a casing open at one end and substantially closed at the opposite end, and having a vent port in such substantially closed end, a thermostat unit having a base equipped with means for internal connection with the sides of the casing intermediate the ends thereof and adapted to be passed into the casing through such open end, said base being constructed with a rigid, continuous, annular rim and being depressed within the rim, a flexible diaphragm sealed hermetically to said rim and extending across the depression of the base, making a closed chamber, and a valve element carried by said diaphragm and located thereby adjacent said port in position to open and close the latter with movements of the diaphragm effected by expansion and contraction of a fluid in said chamber.

WILLIAM K. SIMPSON.